US012200821B2

(12) United States Patent
Reevell

(10) Patent No.: US 12,200,821 B2
(45) **Date of Patent: *Jan. 14, 2025**

(54) METHOD OF MAKING AEROSOL-GENERATING SYSTEM

(71) Applicant: Altria Client Services LLC, Richmond, VA (US)

(72) Inventor: Tony Reevell, London (GB)

(73) Assignee: Altria Client Services LLC, Richmond, VA (US)

( * ) Notice: Subject to any disclaimer, the term of this patent is extended or adjusted under 35 U.S.C. 154(b) by 635 days.

This patent is subject to a terminal disclaimer.

(21) Appl. No.: 17/202,579

(22) Filed: Mar. 16, 2021

(65) Prior Publication Data

US 2021/0204363 A1 Jul. 1, 2021

Related U.S. Application Data

(60) Division of application No. 15/428,275, filed on Feb. 9, 2017, now Pat. No. 11,064,741, which is a (Continued)

(30) Foreign Application Priority Data

Feb. 9, 2016 (EP) .................................... 16154899

(51) Int. Cl.
*H05B 1/02* (2006.01)
*A24F 40/40* (2020.01)

(Continued)

(52) U.S. Cl.
CPC ........... *H05B 1/0227* (2013.01); *A24F 40/40* (2020.01); *H05B 1/0244* (2013.01); *H05B 3/04* (2013.01);

(Continued)

(58) Field of Classification Search
CPC ....... A24F 40/40; A24F 40/53; H05B 1/0244; H05B 2203/021
See application file for complete search history.

(56) References Cited

U.S. PATENT DOCUMENTS 5,237,211 A 8/1993 Tanaka et al.
11,064,741 B2 * 7/2021 Reevell ................ H05B 1/0244

(Continued)

FOREIGN PATENT DOCUMENTS

CN 1498663 A 5/2004
CN 102940313 A 2/2013

(Continued)

OTHER PUBLICATIONS

Chinese Notice of Allowance dated Feb. 20, 2021, issued in corresponding Chinese Patent Application No. 201680079090.5.

(Continued)

*Primary Examiner* — Sang Y Paik
(74) *Attorney, Agent, or Firm* — Harness, Dickey & Pierce, P.L.C.

(57) ABSTRACT

The method includes electrically connecting a first line and a second line to a first terminal and a second terminal, the first line and the second line being in parallel, first configuring an aerosol-generator and a first barrier element within the first line, and second configuring an identifying element and a second barrier element within the second line. The first barrier element and the second barrier element each have an asymmetric electrical conductance. The first and second configuring configures the aerosol-generating system so that a first electrical current applied through the first and second terminal in a first direction allows the first electrical current to pass through the identifying element without activating the aerosol-generator, and a second electrical current applied through the first and second terminal in a second direction allows the second electrical current to activate the aerosol- (Continued)

generator without the second electrical current passing through the identifying element.

20 Claims, 4 Drawing Sheets

Related U.S. Application Data continuation of application No. PCT/EP2016/082852, filed on Dec. 29, 2016.

(51) Int. Cl.

| | |
|---|---|
| ***H05B 3/04*** | (2006.01) |
| ***H05B 3/44*** | (2006.01) |
| *A24F 40/10* | (2020.01) |
| *A24F 40/53* | (2020.01) |

(52) U.S. Cl.

CPC ................ *H05B 3/44* (2013.01); *A24F 40/10* (2020.01); *A24F 40/53* (2020.01); *H05B 2203/014* (2013.01); *H05B 2203/021* (2013.01); *H05B 2203/022* (2013.01)

(56) References Cited

U.S. PATENT DOCUMENTS

| | | | | |
|---|---|---|---|---|
| 2003/0026462 | A1 | 2/2003 | Chung et al. | |
| 2004/0149296 | A1 | 8/2004 | Rostami et al. | |
| 2010/0163063 | A1* | 7/2010 | Fernando ................ | A24F 40/50<br>131/330 |
| 2011/0155718 | A1 | 6/2011 | Greim et al. | |
| 2011/0265806 | A1 | 11/2011 | Alarcon et al. | |
| 2012/0176180 | A1 | 7/2012 | Saed et al. | |
| 2012/0199146 | A1 | 8/2012 | Marangos | |
| 2012/0318882 | A1 | 12/2012 | Abehasera | |
| 2013/0306084 | A1 | 11/2013 | Flick | |
| 2013/0319435 | A1 | 12/2013 | Flick | |
| 2014/0064715 | A1 | 3/2014 | Greim et al. | |
| 2014/0253144 | A1 | 9/2014 | Novak, III et al. | |
| 2014/0270727 | A1 | 9/2014 | Ampolini et al. | |
| 2014/0338685 | A1 | 11/2014 | Amir | |
| 2015/0020827 | A1* | 1/2015 | Liu ......................... | A24F 40/40<br>131/329 |
| 2015/0075545 | A1 | 3/2015 | Xiang | |
| 2015/0082859 | A1 | 3/2015 | Xiang | |
| 2015/0181945 | A1 | 7/2015 | Tremblay | |
| 2015/0208731 | A1 | 7/2015 | Malamud et al. | |
| 2019/0200675 | A1* | 7/2019 | Bache ...................... | H05B 3/16 |

FOREIGN PATENT DOCUMENTS

| | | | |
|---|---|---|---|
| CN | 103929988 | A | 7/2014 |
| CN | 104540406 | A | 4/2015 |
| CN | 105027016 | A | 11/2015 |
| EP | 2100525 | A1 | 9/2009 |
| EP | 2340730 | A1 | 7/2011 |
| EP | 2399636 | A1 | 12/2011 |
| EP | 2468118 | A1 | 6/2012 |
| JP | 2000041654 | A | 2/2000 |
| KR | 10-20120102131 | A | 9/2012 |
| KR | 10-20130130763 | A | 12/2013 |
| WO | WO-2014-040988 | A2 | 3/2014 |
| WO | WO-2014/201432 | A1 | 12/2014 |
| WO | WO-2014205456 | A2 | 12/2014 |
| WO | WO-2015/015431 | A1 | 2/2015 |
| WO | WO-2015/035674 | A1 | 3/2015 |

OTHER PUBLICATIONS

Extended European Search Report for European Patent Application No. 16154899.5 Dated Aug. 17, 2016.
International Preliminary Report for Application No. PCT/EP2016/082852 dated Jun. 7, 2018.
International Search Report and Written Opinion for Application No. PCT/EP2016/082852 dated Mar. 21, 2017.
Written Opinion for Application No. PCT/EP2016/082852 dated Jan. 30, 2018.
International Search Report and Written Opinion for Application No. PCT/EP2016/082852 dated Apr. 20, 2017.
Decision to Grant and Search Report issued Feb. 25, 2020 in Russian Application No. 2018132043/12(052323).
Chinese Office Action dated Sep. 3, 2020, issued in corresponding Chinese Patent Application No. 201680079090.5.
Decision to Grant dated Dec. 15, 2020, issued in corresponding Japanese Patent Application No. 2018-540840.
Korean Office Action, dated Nov. 28, 2023, issued in Korean Patent Application No. 10- 2018-7020679.
Korean Notice of Allowance, dated Apr. 29, 2024, issued in Korean Patent Application No. 10-2018-7020679.

* cited by examiner

METHOD OF MAKING AEROSOL-GENERATING SYSTEM

PRIORITY

This is a divisional of U.S. application Ser. No. 15/428,275, filed Feb. 9, 2017, which is a continuation of and claims priority to PCT/EP2016/082852 filed on Dec. 29, 2016 which claims priority to EP 16154899.5 filed on Feb. 9, 2016, the disclosures of each of which are hereby incorporated by reference in their entirety.

BACKGROUND

The invention relates to electrically operated aerosol-generating systems and in particular to an element for an electrically operated vaping system that can be controlled to perform two different functions in a simple and/or inexpensive manner.

One type of electrically operated aerosol-generating system is an electrically operated vaping system, such as an e-cigarette. Handheld electrically operated vaping systems that atomise or vaporize a liquid substrate typically consist of a device portion comprising a battery and control electronics, and a cartridge portion comprising a supply of aerosol-forming substrate and an electrically operated atomiser. A cartridge comprising both a supply of aerosol-forming substrate and a atomiser is sometimes referred to as a “cartomiser”. The atomiser is typically a heater assembly. In some known examples, the aerosol-forming substrate is a liquid aerosol-forming substrate. The vaporizer includes a coil of heater wire wound around an elongate wick soaked in liquid aerosol-forming substrate and vaporizes the liquid aerosol-forming substrate. The cartridge portion typically comprises not only the supply of aerosol-forming substrate and an electrically operated heater assembly, but also a mouthpiece, through which aerosol is drawn. Other similar arrangements are possible. For example, a vaping system may comprise three parts, a device portion comprising a battery and control electronics, a cartridge portion comprising a supply of aerosol-forming substrate, and an electrically operated atomiser portion comprising a atomiser. In this example, both the cartridge portion and the atomiser portion may be disposable but may have different expected lifetimes. Also, vaping systems that heat solid aerosol-forming substrates, such as cut tobacco, are known in the art and may comprise a removable and replaceable heating element.

In addition to simply generating aerosol from a substrate, it may be desirable for the cartridge or other disposable element of the system to perform other functions, such as providing an indication of liquid remaining or providing an electronic signal identifying the type of liquid in the cartridge to the device portion. Cartomisers with additional functions of this type are known. However, providing additional functions leads to additional complexity and cost in what is typically a disposable element. In order to keep production costs low and minimise device complexity, it would be desirable to achieve additional functions in as simple a manner as possible.

SUMMARY

In one embodiment, an aerosol-generating element of an electrically operated aerosol-generating system, includes first and second electrical connection terminals; a first electrical element, the first electrical element being an aerosol-generator, connected between the first and second electrical connection terminals; a second electrical element connected between the first and second electrical connection terminals; a first barrier element connected between the first electrical element and the second electrical connection terminal; and a second barrier element connected between the second electrical element and the first electrical connection terminal. The second barrier element has an asymmetric conductance arranged to prevent a current flow through the second electrical element when current is applied to the connection terminals in a first direction but permit a current flow through the second electrical element when current is applied to the connection terminals in a second direction, opposite to the first direction, and wherein the first barrier element has an asymmetric conductance arranged to prevent a current flow through the first electrical element when current is applied to the connection terminals in the second direction but permit a current flow through the first electrical element when current is applied to the connection terminals in the first direction.

With this arrangement only two connection terminals are required to provide two separate functions. The first electrical element and the second electrical element are different to one another. When current is applied to the connection terminals in a first direction the first element acts as an aerosol-generator. When current is applied to the connection terminals in a reverse direction, the second element carries out a second function. The first and second barrier elements control the current flow path depending on the direction of the current applied to the connection terminals.

The second electrical element may provide one of a number of different functions. For example, the second electrical element may be an electrical fuse that can be blown to disable the aerosol-generating element. The second electrical element may be a second aerosol-generator to provide an alternative aerosol generating method or mode of operation. The second electrical element may a resistor, capacitor or inductor used to electrically identify the aerosol-generating element. The second electrical element may be a sensor configured, for example, to detect a level of substrate remaining in the aerosol-generating element, or configured to measure a temperature. The second electrical element may be a memory for recording usage data.

Each of the first and second barrier elements may comprise a diode. Alternatively, or in addition, the first barrier element, or the second barrier element, or both the first and second barrier elements may comprise a transistor. Each of the first and second barrier elements may comprise a p-n junction. The first barrier element may comprise a light emitting diode that emits light when current is flowing through the aerosol-generator. This provides a visual indication that the aerosol-generator is activated. The second barrier element may also comprise a light emitting diode. The second barrier element may emit light of a different wavelength to the first diode.

The aerosol-generator is an element that in operation generates an aerosol from an aerosol-forming substrate. The aerosol-generator may be an atomiser or vaporizer, and be collectively referred to as an atomizer. The atomiser may comprise a heater configured to heat an aerosol-forming substrate. The heater may comprise one or more heating elements. The one or more heating elements may be arranged appropriately so as to most effectively heat the aerosol-forming substrate. The one or more heating elements may be arranged to heat the aerosol-forming substrate primarily by conduction. The one or more heating elements may be arranged substantially in direct contact with the aerosol-forming substrate. The one or more heating elements may be arranged to transfer heat to the aerosol-forming substrate via one or more heat conductive elements. The one or more heating elements may be arranged to transfer heat to ambient air drawn through the aerosol-generating system during use, which may heat the aerosol-forming substrate by convection. The one or more heating elements may be arranged to heat the ambient air before it is drawn through the aerosol-forming substrate. The one or more heating elements may be arranged to heat the ambient air after it is drawn through the aerosol-forming substrate.

The one or more electric heating elements may comprise an electrically resistive material. Suitable electrically resistive materials may include: semiconductors such as doped ceramics, electrically "conductive" ceramics (such as, for example, molybdenum disilicide), carbon, graphite, metals, metal alloys and composite materials made of a ceramic material and a metallic material.

The one or more electric heating elements may take any suitable form. For example, the one or more electric heating elements may take the form of one or more heating blades or one or more heating wires or filaments in the form of a coil. The one or more electric heating elements may take the form of a casing or substrate having different electro-conductive portions, or one or more electrically resistive metallic tubes.

The heater may comprise inductive heating elements.

Alternatively, or in addition, the atomiser may comprise one or more vibratable elements and one or more actuators arranged to excite vibrations in the one or more vibratable elements. The one or more vibratable elements may comprise a plurality of passages through which aerosol-forming substrate may pass and become atomised. The one or more actuators may comprise one or more piezoelectric transducers.

In use, atomised aerosol-forming substrate may be mixed with and carried in air flow through an air flow passage of the aerosol-generating system.

The aerosol-generating element may comprise a supply of aerosol-forming substrate. The aerosol-forming substrate may be liquid. The aerosol-generating element may comprise a liquid storage portion. The aerosol-forming substrate may be liquid at room temperature. The aerosol-forming substrate may comprise both liquid and solid elements. The aerosol-forming substrate may comprise nicotine. The nicotine containing liquid aerosol-forming substrate may be a nicotine salt matrix. The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may comprise homogenised tobacco material. The aerosol-forming substrate may comprise a non-tobacco-containing material. The aerosol-forming substrate may comprise homogenised plant-based material.

The liquid aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The liquid aerosol-forming substrate may comprise other additives and ingredients, such as flavourants.

The liquid aerosol-forming substrate may comprise water, solvents, ethanol, plant extracts and natural or artificial flavours. The liquid aerosol-forming substrate may comprise one or more aerosol formers. Examples of suitable aerosol formers include glycerine and propylene glycol.

The liquid aerosol-forming substrate may comprise nicotine and at least one aerosol former. The aerosol former may be glycerine. The aerosol-former may be propylene glycol. The aerosol former may comprise both glycerine and propylene glycol. The liquid aerosol-forming substrate may have a nicotine concentration of between about 2% and about 10%.

The aerosol-generating element may comprise one or more capillary wicks for conveying liquid aerosol-forming substrate held in the liquid storage portion to the one or more elements of the aerosol-generator. The liquid aerosol-forming substrate may have physical properties, including viscosity, which allow the liquid to be transported through the one or more capillary wicks by capillary action. The one or more capillary wicks may have any of the properties of structures described above relating to the capillary material.

The one or more capillary wicks may be arranged to contact liquid held in the liquid storage portion. The one or more capillary wicks may extend into the liquid storage portion. In this case, in use, liquid may be transferred from the liquid storage portion to one or more elements of the aerosol-generator by capillary action in the one or more capillary wicks. The one or more capillary wicks may have a first end and a second end. The first end may extend into the liquid storage portion to draw liquid aerosol-forming substrate held in the liquid storage portion into the aerosol-generator. The second end may extend into an air passage of the aerosol-generating system. The second end may comprise one or more aerosol-generating elements. The first end and the second end may extend into the liquid storage portion. One or more aerosol-generating elements may be arranged at a central portion of the wick between the first and second ends. In use, when the one or more aerosol-generating elements are activated, the liquid aerosol-forming substrate in the one or more capillary wicks is atomised at and around the one or more aerosol-generating elements. The aerosol-generating elements may comprise a heating wire or filament. The heating wire or filament may support or encircle a portion of the one or more capillary wicks. The capillary properties of the one or more capillary wicks, combined with the properties of the liquid substrate, may ensure that, during normal use when there is sufficient aerosol-forming substrate, the wick is always wet with liquid aerosol-forming substrate in the area of the aerosol-generator.

Alternatively, the aerosol-forming substrate may be a solid material. Solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco. Solid aerosol-forming substrate may be in loose form, or may be provided in a suitable container or cartridge. Solid aerosol-forming substrate may contain additional tobacco or non-tobacco volatile flavour compounds, to be released upon heating of the solid aerosol-forming substrate.

Solid aerosol-forming substrate may be provided in the aerosol-generating element or may be provided as a separate article to be loaded into or connected to the aerosol-generating element. The solid aerosol-forming substrate may be provided as a vaping article. The aerosol-generator may be configured to heat the solid aerosol-forming substrate to vaporise constituents of the aerosol-forming substrate.

The aerosol-generating element may comprise a mouthpiece portion. The mouthpiece portion may be configured to allow the draw of air through the aerosol-generating element past the atomiser.

The aerosol-generating element may have a housing. The housing may comprise a connecting portion for connection with a main unit comprising a power supply and control electronics. The connecting portion may comprise a screw fitting, a push fitting or a bayonet fitting for example. The housing may have a circular cross-section. The connection terminals may be annular and coaxial with one another. This allows for a reliable connection to be made with a screw fitting without requiring a precise rotational position of the aerosol-generating element.

In another embodiment, an electrically operated aerosol-generating system includes a main unit. The main unit includes a power source, control circuitry and first and second electrical contacts connected to the control circuitry. The system further includes an aerosol-generating element according to the previous embodiment, wherein the first and second electrical contacts of the main body are configured to connect to the first and second electrical connection terminals of the aerosol-generating element.

The control circuitry may be configured to apply a positive voltage difference between the first electrical connection terminal and the second electrical connection terminal in a first mode and may apply a negative voltage difference between the first electrical connection terminal and the second electrical connection terminal in a second mode.

The first and second electrical contacts and the first and second electrical connection terminals may be arranged in any shape or configuration. In one example, the first and second contacts are both annular and are arranged coaxially. This allows for a reliable electrical connection when a screw thread connection is used to connect the main unit to the aerosol-generating element.

The system may be an electrically operated vaping system.

The main unit may comprise one or more power supplies. The power supply may be a battery. The battery may be a Lithium based battery, for example a Lithium-Cobalt, a Lithium-Iron-Phosphate, a Lithium Titanate or a Lithium-Polymer battery. The battery may be a Nickel-metal hydride battery or a Nickel cadmium battery. The power supply may be another form of charge storage device such as a capacitor. The power supply may require recharging and be configured for many cycles of charge and discharge. The power supply may have a capacity that allows for the storage of enough energy for one or more vaping experiences; for example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a desired (or, alternatively a predetermined) number of puffs or discrete activations of the heater and actuator. The aerosol-generating element may be a cartomiser. The cartomiser may comprise a liquid store containing liquid that is atomised by the atomiser in use.

The control circuitry may comprise a microprocessor, for example, a programmable microprocessor. The control circuitry may be configured to control the operation of the atomiser and the second electrical element, and in particular may control the direction in which current is supplied to the first and second electrical connection terminals of the aerosol-generating element in different modes of operation.

The main unit may have a housing. The housing may comprise a connecting portion for connection with the aerosol-generating element. The main unit housing may have a connecting portion corresponding to a connecting portion of the housing of the aerosol-generating element, and may comprise a screw fitting, a push fitting or a bayonet fitting for example.

BRIEF DESCRIPTION OF THE DRAWINGS

Example embodiments will now be described in detail, by way of example only, with reference to the accompanying drawings, in which.

DETAILED DESCRIPTION

Figures 1A, 1B:
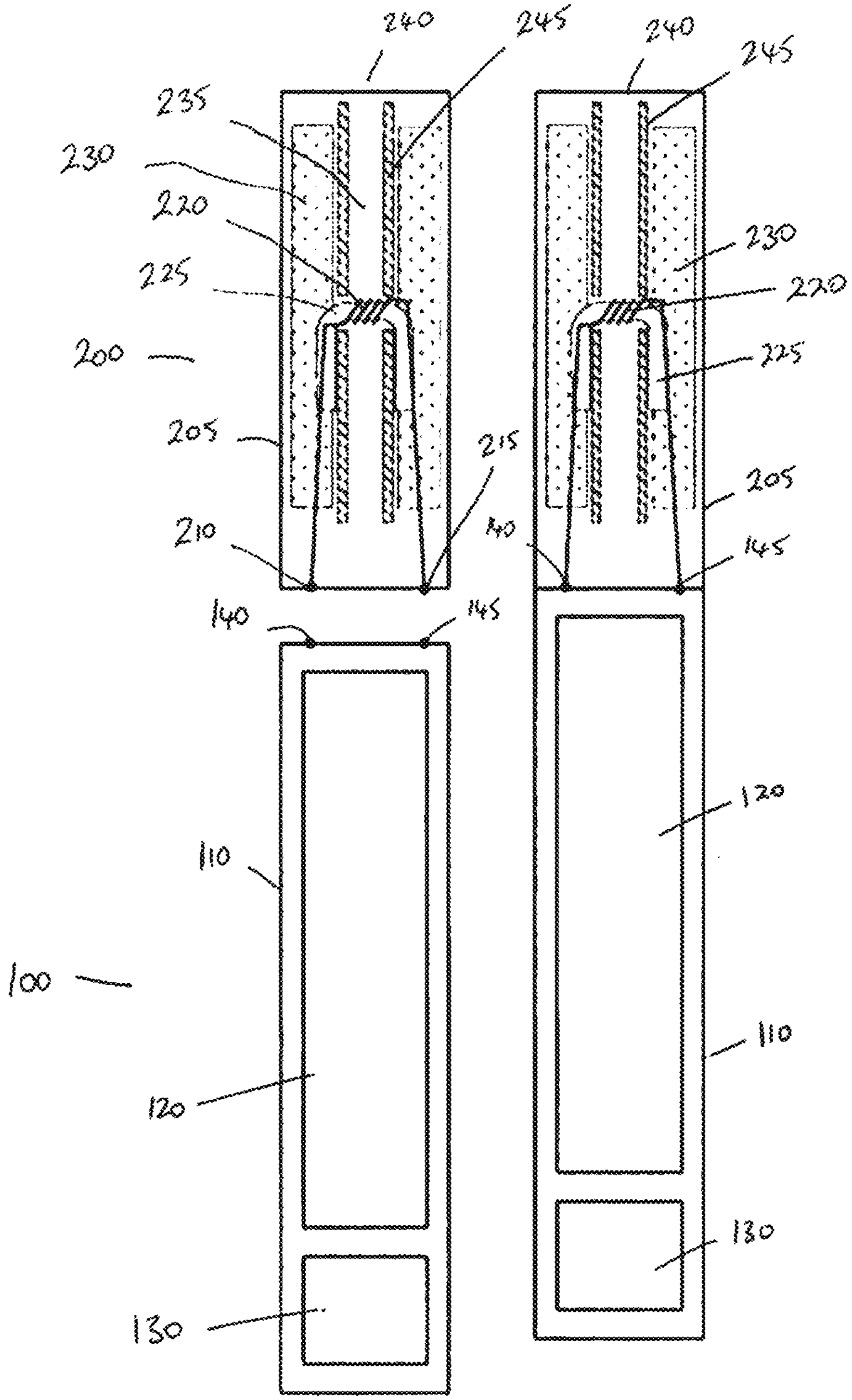
FIG. 1*a* is a schematic illustration of a two element vaping device in accordance with an example, in a disassembled state.
FIG. 1*b* is a schematic illustration of the device of FIG. 1*a* in an assembled state.

Various example embodiments will now be described more fully with reference to the accompanying drawings in which some example embodiments are shown. However, specific structural and functional details disclosed herein are merely representative for purposes of describing example embodiments. Thus, the embodiments may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope. In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, and/or elements, but do not preclude the presence or addition of one or more other features, integers, steps, operations, elements, and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. The plurality of device structures may be arranged in an array and/or in a two-dimensional pattern.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various features will be described in detail with reference to the attached drawings. However, example embodiments described are not limited thereto.

FIG. 1*a* is a schematic illustration of a two element vaping device in a disassembled state. The device comprises a main unit 100, comprising a battery 120 and control circuitry 130, and an aerosol-generating element 200, referred to as a cartomiser, comprising an reservoir of liquid 230, an electrically powered heater 220 and a mouthpiece 240.

FIG. 1*b* is a schematic illustration of the device of FIG. 1*a* in an assembled state, with the housing 110 of the main unit 100 fixed to the housing 205 of the aerosol-generating element 200. Power is provided from the battery 120 in the main unit 100 to the heater 220 in aerosol-generating element 200, under the control of the control circuitry 130. When the main unit 100 is connected to the aerosol-generating element 200, electrical connection terminals 210, 215 mate with electrical contacts 140, 145 on the main unit 100. Electrical current can be supplied through the electrical contacts and connection terminals. Although it is illustrated only schematically, the connection between the main unit 100 and the aerosol-generating element 200 is made by a screw connection. Both the electrical connection terminals and the electrical contacts can be arranged as annular, coaxial connectors so that the relative rotational position of the main unit and the aerosol-generating element is not critical to provide an effective electrical connection.

The liquid in the reservoir 230 is delivered to the heater 220 by a capillary wick 225. The capillary wick 225 extends across an airflow passage 235 through a tube 245 running through the centre of the aerosol-generating element. The heater 220 comprises a heater filament, coiled around the capillary wick 225 within the airflow passage. The heater 220 is electrically connected to the electrical connection terminals 210, 215.

The device illustrated in FIGS. 1*a* and 1*b* operates as follows. When the mouthpiece 240 is drawn upon, air is drawn into the airflow passage 235 through inlet holes (not shown) in the housing of the main unit and the aerosol-generating element. An airflow sensor, such as a microphone (not shown) is provided in the main unit and senses the flow of air. When a sufficient airflow is detected, the control circuitry 130 supplies power to the heater 220. This causes the heater 220 to heat up and vapourise the liquid in the immediate vicinity of the heater. The resulting vapour is cooled in the air flowing past the heater and condenses to form an aerosol. The aerosol is then drawn out through the mouthpiece 240. When air is no longer drawn through the mouthpiece, and the airflow past the airflow sensor drops below a threshold level, the control circuitry 130 cuts power to the heater 220. The liquid in the capillary wick is replenished by capillary action from the liquid reservoir.

However, as will be described, in example embodiments, the aerosol-generating element performs another function, additional to atomising the substrate, and an additional electrical element or electrical elements, described in detail with respect to FIGS. 2-6, are provided for that function. The additional function may be to identify to the control circuitry the type of liquid in the cartomiser, or may be to provide the control circuitry with a measurement of a parameter of the system, such as heater temperature or liquid level within the liquid storage portion, or may be to record usage data for the cartomiser. Alternatively, the additional function may be to disable the cartomiser in certain conditions, such as a malfunction or after a certain period of use.

Ordinarily, in order to provide such additional functionality in a cartomiser, it is necessary to provide further, function specific, electrical connections between the main unit and the cartomiser. So one pair of connection terminals may be used to connect the atomiser to the control circuitry, and another pair of electrical connections may be used to transfer power or data between the additional electrical elements in the cartomiser and the control circuitry in the main unit. This significantly increases the complexity and cost of the main unit. It also increases the probability of a malfunction of breakage, and reduces the reliability of the connection between the main unit and the cartomiser.

Figure 2:
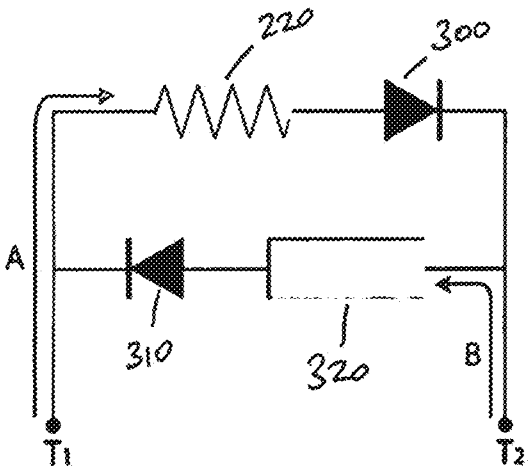
FIG. 2 is a circuit arrangement in accordance with a first embodiment.

However, it is possible to provide for additional functions using just the single pair of electrical connections between the main unit and the cartomiser. FIG. 2 illustrates a basic circuit arrangement for providing an identifying resistor in the cartomiser that can be measured by the control circuitry in the main unit before power is supplied to the heater. This is useful because different liquid compositions in different cartomisers or different arrangements of heater and airflow in different cartomisers may require different management of power supplied to the heater in order to provide an optimal experience. By identifying the type of cartomiser connected to the main unit before application of power to the heater, an appropriate power management program can be selected. It may also be beneficial for detecting counterfeit cartomisers. If an identifying resistor is not present or is not of a recognised value, the control circuitry may be configured to prevent the supply of power to the cartomiser.

In the arrangement of FIG. 2, the electrical connection terminals 210, 215 are labelled $T_1$ and $T_2$ respectively. The heater 220 is connected directly to $T_1$ and is connected to $T_2$ through a first diode 300. The first diode prevents a flow of current from $T_2$ to $T_1$ through the heater 220. The identifying resistor 320 is connected to the connection terminals in parallel with the heater. The identifying resistor is connected directly to $T_2$ and is connected to $T_1$ through a second diode 310. The second diode prevents a flow of current from $T_1$ to $T_2$ through the resistor 320.

The first and second diodes in FIG. 2 are simple p-n junction diodes. However, one or both diode may be light emitting diodes or diodes of another type.

So, in order to measure the resistance of the identifying resistor 320 without activating the heater, the control circuitry 130 applies current to the connection terminals so that current can pass through the identifying resistor, shown as arrow B. In order to activate the heater without dissipating power in the resistor 320, the control circuitry 130 applies current to the connection terminals in the reverse direction, shown as arrow A. The arrangement shown in FIG. 2 effectively enables two separate and independent circuits to be created using a single pair of electrical connections, in a simple and inexpensive manner. The resistor 320 can be replaced by an identifying electrical element of another type, such as a capacitor or inductor.

Figure 3:
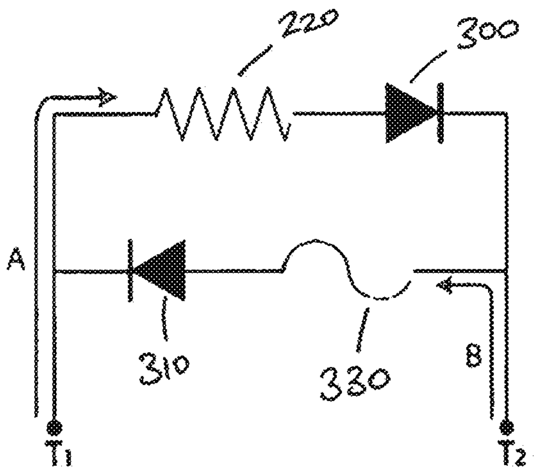
FIG. 3 is a circuit arrangement in accordance with a second embodiment.

FIGS. 3, 4, 5 and 6 illustrate similar circuit arrangements to that shown in FIG. 2, but are configured to provide different secondary functions. In FIG. 3 a fuse 330 is provided in place of the resistor 320 of FIG. 2. A fuse may be provided to prevent reuse of the cartomiser after the supply of aerosol-forming substrate has been exhausted. For example, the control circuitry 130 may be configured to count the number of times the heater has been activated following connection of a new cartomiser to the main unit, and when the count reaches a desired (or, alternatively a predetermined) number, the control circuitry 130 may be configured to apply a current through the fuse 330, sufficient to blow the fuse. When a new cartomiser is connected to the main unit, the control circuitry 130 may be configured to pass a smaller current from $T_2$ to $T_1$, insufficient to blow the fuse 330, to check that a fuse is present and intact. If no current can flow from T2 to T1, then a fuse is not present or has blown and the control circuitry 130 may be configured to prevent the supply of power to the cartomiser.

Figure 4:
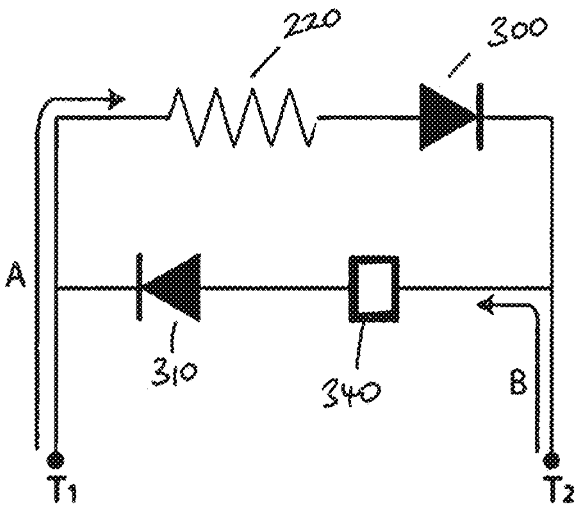
FIG. 4 is a circuit arrangement in accordance with a third embodiment.

In FIG. 4, the resistor of FIG. 2 is replaced by a sensor 340. The sensor 340 may be a liquid level sensor that allows liquid level to be checked before each heater activation or before each vaping session. If the level of liquid in the liquid reservoir is below a threshold, the control circuitry 130 may be configured to prevent the supply of power to the heater.

Figure 5:
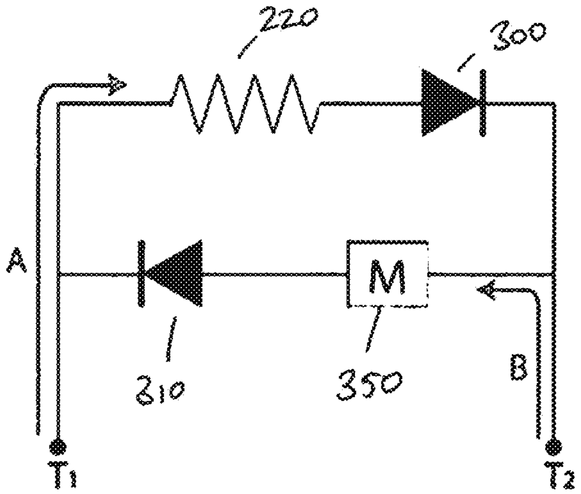
FIG. 5 is a circuit arrangement in accordance with a fourth embodiment.

In FIG. 5, the resistor of FIG. 2 is replaced by a memory 350. The memory may be used to store usage data for the consumable. The usage data may include, for example, usage time, number of puffs, number of vaping sessions and estimated liquid use or estimated liquid remaining. After each puff, the control circuitry 130 may update the record stored in the memory. The provision of a memory is particularly useful for refillable cartomisers that can be swapped. By storing the data on the cartomiser, each cartomiser retains a record of its use. This has advantages over storing usage data on the main unit, as that would require the main unit to uniquely identify each cartomiser before use and maintain a record for each cartomiser used.

Figure 6:
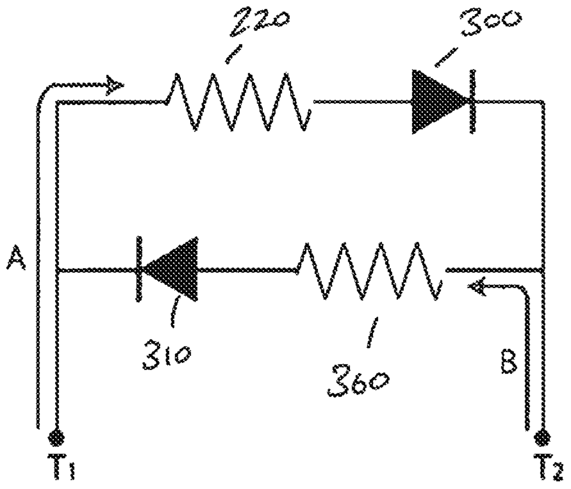
FIG. 6 is a circuit arrangement in accordance with a first embodiment.

In FIG. 6, the resistor of FIG. 2 is replaced by a second heater 360. A second heater may be provided in the same location as the first heater 220 in order to give rise to a different heating effect. Alternatively, a second heater may be provided in a different location within the cartomiser in order to heat a different liquid or in order to allow more time for liquid at the first heater to be replenished following activation of the first heater. The control circuitry 130 may be configured to activate each heater on different but alternate puffs. Alternatively, heater to be used for a particular vaping session may be selectable.

Example embodiments allow a cartomiser to have two separate and independent functions whilst only having a standard two terminal connection. By maintaining only two connections, the device can remain simple to construct, cheap to make and/or more reliable than more complicated solutions having more than two connection terminals.

It should be clear that the examples described herein are simple examples, and that modifications may be made to the illustrated circuits to provide different or more sophisticated functionality. For example, in each of the illustrated circuits the barrier elements are simple diodes, which has the advantage of being simple and inexpensive. However, it is possible to use another element, such as a transistor, or a combination of elements, to provide the same function.

It should also be clear that types of aerosol-generating systems different to that illustrated in FIG. 1 could incorporate the invention. In particular, vaping systems that operate by heating a solid aerosol-forming substrate may usefully be made in accordance with the invention.

The invention claimed is:

1. A method of making an aerosol-generating system, comprising:

electrically connecting a first line and a second line to a first terminal and a second terminal, the first line and the second line being in parallel;

configuring an aerosol-generator and a first barrier element within the first line; and configuring an identifying element and a second barrier element within the second line, the first barrier element and the second barrier element each having an asymmetric electrical conductance, the configuring of the aerosol-generator and the first barrier element and the configuring of the identifying element and the second barrier element configures such that a first electrical current applied through the first terminal and second terminal in a first direction allows the first electrical current to pass through the identifying element without activating the aerosol-generator, and a second electrical current applied through the first terminal and second terminal in a second direction allows the second electrical current to activate the aerosol-generator without the second electrical current passing through the identifying element.

2. The method of claim 1, wherein the configuring of the aerosol-generator and the first barrier element, and the configuring of the identifying element and the second barrier element, configures such that the first electrical current allows a resistance of the identifying element to be detected.

3. The method of claim 1, wherein the identifying element includes an electrical fuse.

4. The method of claim 1, wherein the identifying element includes at least one of a resistor, a capacitor or an inductor.

5. The method of claim 1, wherein the identifying element includes a sensor.

6. The method of claim 1, wherein the identifying element includes a memory.

7. The method of claim 1, wherein the aerosol-generator is a resistive heater.

8. The method of claim 1, wherein the aerosol-generator is in a cartridge, the cartridge including a liquid storage portion containing liquid that is aerosolized by the aerosol-generator if the aerosol-generating system is in active use.

9. The method of claim 1, wherein the first terminal and the second terminal are annular and coaxial with each other.

10. The method of claim 1, wherein the first barrier element and the second barrier element includes one of a semiconductor diode or a transistor.

11. The method of claim 1, wherein the first barrier element includes a light emitting diode.

12. The method of claim 1, further comprising:

configuring the aerosol-generating system with control circuitry, the control circuitry being operatively connected to the first terminal, the second terminal, and a power source.

13. The method of claim 12, wherein the configuring of the aerosol-generator and the first barrier element, and the configuring of the identifying element and the second barrier element, configures such that resistance information for the identifying element is detected, and the configuring of the aerosol-generating system further configures the control circuitry to identify a type of an aerosol-generating element of the aerosol-generating system based on the resistance information, the aerosol-generator being in the aerosol-generating element.

14. The method of claim 12, wherein the identifying element includes an electrical fuse, and the configuring of the aerosol-generating system further configures the control circuitry to adjust a magnitude of the first electrical current that passes through the electrical fuse to ensure that an aerosol-generating element of the aerosol-generating system is not overused, the aerosol-generator being in the aerosol-generating element.

15. The method of claim 12, wherein the configuring of the aerosol-generator and the first barrier element, and the configuring of the identifying element and the second barrier element, configures such that resistance information for the identifying element is detected, the identifying element including at least one of a resistor, a capacitor or an inductor, and the configuring of the aerosol-generating system further configures the control circuitry to identify a type of an aerosol-generating element of the aerosol-generating system based on the resistance information, the aerosol-generator being in the aerosol-generating element.

16. The method of claim 1, further comprising:

configuring the aerosol-generating system with control circuitry, the control circuitry being operatively connected to the first terminal, the second terminal, and a power source, the power source and the control circuitry being in a main unit of the aerosol-generating system, and the aerosol-generator being in an aerosol-generating element of the aerosol-generating system.

17. The method of claim 16, wherein the identifying element includes a memory, the memory being operatively connected to the control circuitry, and the configuring of the aerosol-generating system further configures the control circuitry to access usage data in the memory to determine usage information for the aerosol-generating element.

18. The method of claim 16, wherein the identifying element includes a sensor, the sensor being configured to measure liquid level information for the aerosol-generating element, and the configuring of the aerosol-generating system further configures the control circuitry to adjust an operation of the aerosol-generating system based on the liquid level information.

19. The method of claim 16, wherein the aerosol-generating element is a cartridge.

20. The method of claim 16, wherein the main unit is selectively connectable to the aerosol-generating element.

* * * * *